(12) United States Patent
Williams et al.

(10) Patent No.: US 12,501,918 B2
(45) Date of Patent: Dec. 23, 2025

(54) MANUFACTURE OF SNACK FOOD PELLETS

(71) Applicant: Frito-Lay Trading Company Gmbh, Berne (CH)

(72) Inventors: James Williams, Leicester (GB); Marcel Oost Indie, Leicester (GB); Kal Ezzat, Leicester (GB); Rachel Mallinder, Leicester (GB)

(73) Assignee: Frito-Lay Trading Company GmbH, Berne (CH)

( * ) Notice: Subject to any disclaimer, the term of this patent is extended or adjusted under 35 U.S.C. 154(b) by 761 days.

(21) Appl. No.: 16/616,329

(22) PCT Filed: May 30, 2018

(86) PCT No.: PCT/EP2018/064174
§ 371 (c)(1),
(2) Date: Nov. 22, 2019

(87) PCT Pub. No.: WO2018/220006
PCT Pub. Date: Dec. 6, 2018

(65) Prior Publication Data
US 2020/0154741 A1    May 21, 2020

(30) Foreign Application Priority Data
May 31, 2017   (GB) ..................... 1708669

(51) Int. Cl.
*A23L 5/10*      (2016.01)
*A23L 7/10*      (2016.01)
(Continued)

(52) U.S. Cl.
CPC .................. *A23L 5/13* (2016.08); *A23L 7/17* (2016.08); *A23L 11/05* (2016.08); *A23L 19/12* (2016.08);
(Continued)

(58) Field of Classification Search
CPC ... A23L 5/13; A23L 7/17; A23L 11/05; A23L 19/12; A23L 29/212; A23P 30/20; A23P 30/38
See application file for complete search history.

(56) References Cited

U.S. PATENT DOCUMENTS 2,954,296 A * 9/1960 Clausi ..................... A23L 7/165
426/446
3,539,356 A * 11/1970 Benson ..................... A23L 7/13
426/549
(Continued)

FOREIGN PATENT DOCUMENTS

EP            0039185 A1     11/1981
WO       2008/118585 A2     10/2008
(Continued)

OTHER PUBLICATIONS

PCT Search Report and Written Opinion for PCT/EP2018/064174 dated Aug. 16, 2018 (17 pages).
(Continued)

*Primary Examiner* — Ericson M Lachica
(74) *Attorney, Agent, or Firm* — Barnes & Thornburg LLP; G. Peter Nichols

(57) ABSTRACT

A method of manufacturing a starch-based snack food pellet for manufacturing an expanded snack food, the method comprising the steps of: feeding a first starch ingredient into a cooking device; inputting mechanical and thermal energy into the cooking device so as to cook and gelatinise the first starch ingredient in the cooking device, thereby to provide a processed starch component; adding a potato starch ingredient comprising native potato starch to the processed starch component to provide a starch mixture; and forming the starch mixture into pellets by extrusion. Also disclosed is a starch-based snack food pellet for manufacturing an expanded snack food.

18 Claims, 5 Drawing Sheets

(51) Int. Cl.
  *A23L 7/17*    (2016.01)
  *A23L 11/00*   (2025.01)
  *A23L 19/10*   (2016.01)
  *A23L 19/12*   (2016.01)
  *A23L 29/20*   (2016.01)
  *A23L 29/212*  (2016.01)
  *A23P 30/20*   (2016.01)
  *A23P 30/30*   (2016.01)
  *A23P 30/38*   (2016.01)

(52) U.S. Cl.
  CPC ............. *A23L 29/212* (2016.08); *A23P 30/20* (2016.08); *A23P 30/38* (2016.08); *A23V 2002/00* (2013.01)

(56) References Cited

U.S. PATENT DOCUMENTS

| | | | | |
|---|---|---|---|---|
| 3,997,684 | A * | 12/1976 | Willard | A23L 19/19 426/441 |
| 4,025,657 | A * | 5/1977 | Cheng | A23L 9/12 127/71 |
| 4,965,081 | A * | 10/1990 | Lazarus | A23L 19/19 426/242 |
| 6,432,463 | B1 * | 8/2002 | Bhaskar | A23L 19/19 426/496 |
| 2004/0105930 | A1 * | 6/2004 | Morii | A23L 7/165 426/559 |
| 2006/0246195 | A1 | 11/2006 | Karwowski | |
| 2007/0092620 | A1 * | 4/2007 | Zimeri | A23P 30/20 426/549 |
| 2007/0243301 | A1 * | 10/2007 | Barnett | A23P 30/34 426/559 |
| 2008/0003340 | A1 * | 1/2008 | Karwowski | A23L 7/13 426/549 |
| 2008/0085352 | A1 * | 4/2008 | Meijer | A23L 5/13 426/559 |
| 2008/0102165 | A1 * | 5/2008 | Ning | A23P 30/20 426/72 |
| 2009/0258113 | A1 * | 10/2009 | Emerson | A23P 30/20 426/76 |
| 2013/0243925 | A1 * | 9/2013 | Van Lengerich | A23L 33/21 426/560 |
| 2013/0273219 | A1 * | 10/2013 | Baier | A23L 7/161 426/242 |
| 2015/0132444 | A1 * | 5/2015 | Karwowski | A23P 30/10 426/93 |
| 2016/0213034 | A1 * | 7/2016 | Ogino | A23L 7/113 |
| 2016/0235096 | A1 * | 8/2016 | Arnaudov | A23P 10/47 |
| 2017/0027200 | A1 * | 2/2017 | Avashia | A21D 8/02 |
| 2017/0035082 | A1 * | 2/2017 | Tutuncu | A23L 7/109 |
| 2017/0105438 | A1 * | 4/2017 | Ajami | A23L 13/42 |
| 2017/0208846 | A1 * | 7/2017 | Fujimura | A23L 29/10 |
| 2018/0199591 | A1 * | 7/2018 | Kindelspire | A23L 19/09 |
| 2018/0317530 | A1 * | 11/2018 | Rade-Kukic | A23L 7/11 |
| 2019/0269151 | A1 * | 9/2019 | Solorio | A21D 13/04 |

FOREIGN PATENT DOCUMENTS

| | | |
|---|---|---|
| WO | 2012/135292 A2 | 10/2012 |
| WO | 2016/135292 A1 | 9/2016 |
| WO | 2016135292 | 9/2016 |

OTHER PUBLICATIONS

PCT/ISA/206 for PCT/EP2018/064174 with Annex dated Jul. 13, 2018 (12 pages).
Office Action issued on Oct. 25, 2022 in Chinese Application No. 201880035789.0.
Office Action issued on Mar. 15, 2023 in Chinese Application No. 201880035789.0.
Office Action issued on Feb. 17, 2025 in Mexican Appl. No. MX/a/2019/014312.
Office Action issued on Feb. 23, 2024 in Mexican Appl. No. MX/a/2019/014312.
Examination Report issued on Mar. 25, 2024 in European Appl. No. 18728862.6.
Office Action issued on Sep. 2, 2024 in Mexican Appl. No. MX/a/2019/014312.
Examination Report issued on Oct. 22, 2024 in European Appl. No. 18728862.6.

* cited by examiner

MANUFACTURE OF SNACK FOOD PELLETS

CROSS-REFERENCE TO RELATED APPLICATIONS

This application is a US 371 application from PCT/EP2018/064174 filed May 30, 2018, published as WO 2018/220006 A1 on Dec. 6, 2018, which claims priority to GB Application 1708669.5 filed May 31, 2017, published as 2567612 A on Apr. 24, 2019, the technical disclosures of which applications and publications are hereby incorporated by reference in their entirety.

BACKGROUND

1. Field of the Invention

The present invention relates to a method of manufacturing a starch-based snack food pellet for producing an expanded snack food, a starch-based snack food pellet for producing an expanded snack food, and an expanded snack food produced from a starch-based snack food pellet.

2. Description of the Related Art

The use of starch-based pellets to produce snack foods, typically in the form of snack chips, is well known in the art. The pellet is produced by extrusion. On subsequent cooking, for, by being fried, baked, microwaved, directly extruded or popped, the pellet expands to produce an expanded low density porous snack food.

The pellets include a high proportion of starch. It is essential that, when subjected to rapid high temperature cooking, the starch expands to produce a light and highly porous structure in the expanded snack food which is substantially homogeneous and substantially avoids the presence of unexpanded glassy regions.

Many snack food products are produced from pellets having a starch content which comprises a mixture of starches to provide desired properties in the resultant expanded snack food. For example, many pellets include a significant proportion, up to 100 wt %, of starch in the total starch content. Potato starch can give characteristic properties to the expanded snack food, with regard to sensory experience, mouthfeel, crunchiness, crispness, degree of expansion, cell size and cell wall thickness, etc.

When a mixture of starches is employed, for example to provide a modified sensory experience, or to use a mixture of a potato starch and a non-potato starch to provide a less expensive pellet or a pellet which is preferred to manufacture in a country in which potatoes are not grown locally using a high proportion of locally sourced ingredients, the mixture may combine potato starch and starch from cereals (such as wheat, corn, barley, rice, etc.) and/or roots (such as tapioca or sweet potato) and/or pulses (such as peas or beans).

A problem of manufacturing pellets from a mixture of potato starch(es) and non-potato starch(es) is that during manufacture of the pellet, in order to ensure that the mixture is processed to achieve sufficient processability of the starches so that the starch mixture adequately permits uniform expansion during the later expansion process, the potato starch can be overcooked. The effect of such overcooking is that in the resultant expanded snack food the desired potato characteristics are wholly or partially lost. Furthermore, such overcooking may inhibit or prevent the pellet from producing an expanded snack food, such as a snack chip, with the desired uniform light and airy expanded structure required by consumers.

The present invention aims to solve this problem of the production of known expanded snack foods produced from pellets having a mixture of potato starch(es) and non-potato starch(es).

SUMMARY

Accordingly, the present invention provides a method of manufacturing a starch-based snack food pellet for manufacturing an expanded snack food, the method comprising the steps of:
  a. feeding a first starch ingredient into a cooking device;
  b. inputting mechanical and thermal energy into the cooking device so as to cook and gelatinise the first starch ingredient in the cooking device, thereby to provide a processed starch component;
  c. adding a potato starch ingredient comprising native potato starch to the processed starch component to provide a starch mixture; and
  d. forming the starch mixture into pellets by extrusion.

Typically, the first starch ingredient comprises or consists of native cereal starch, optionally in combination with one or more of a native root (such as tapioca or sweet potato) starch and a native pulse (such as pea or bean) starch.

The present invention further provides a starch-based snack food pellet for manufacturing an expanded snack food, the pellet comprising a starch matrix formed of a mixture of starches, wherein mixture comprises from 40 to 70 wt % of a gelatinised non-potato starch, from 20 to 40 wt % of a native potato starch and from 20 to 70 wt % of a gelatinised potato starch, wherein each wt % is based on the weight of the mixture of starches.

Typically, the non-potato starch comprises or consists of cereal starch, optionally in combination with one or more of a root (such as tapioca or sweet potato) starch and a native pulse (such as pea or bean) starch.

The present invention further provides an expanded snack food produced from the starch-based snack food pellet according to the present invention. The expanded snack food may optionally be fried, baked, microwaved, directly extruded or popped.

Preferred features of all of these aspects of the present invention are defined in the dependent claims.

BRIEF DESCRIPTION OF THE DRAWINGS

Embodiments of the present invention will now be described by way of example only, with reference to the accompanying drawings, in which.

DETAILED DESCRIPTION

Figure 1:
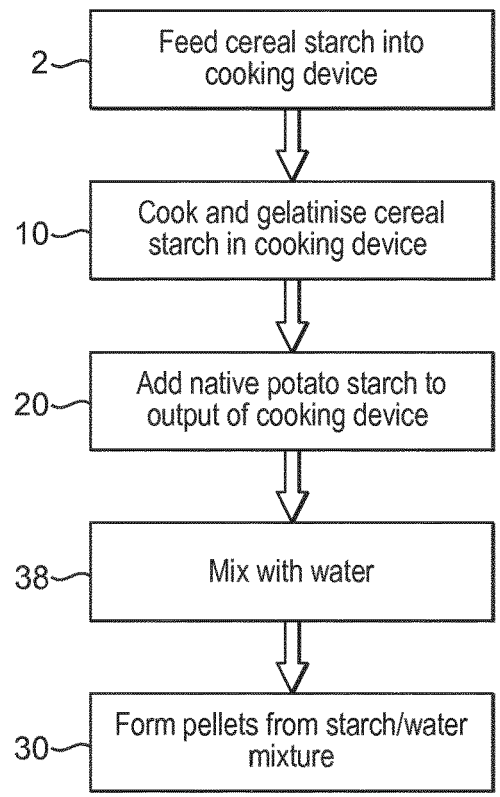
FIG. 1 is a schematic process flow of a method of manufacturing a starch-based snack food pellet for manufacturing an expanded snack food in accordance with an embodiment of the present invention.
Figure 2:
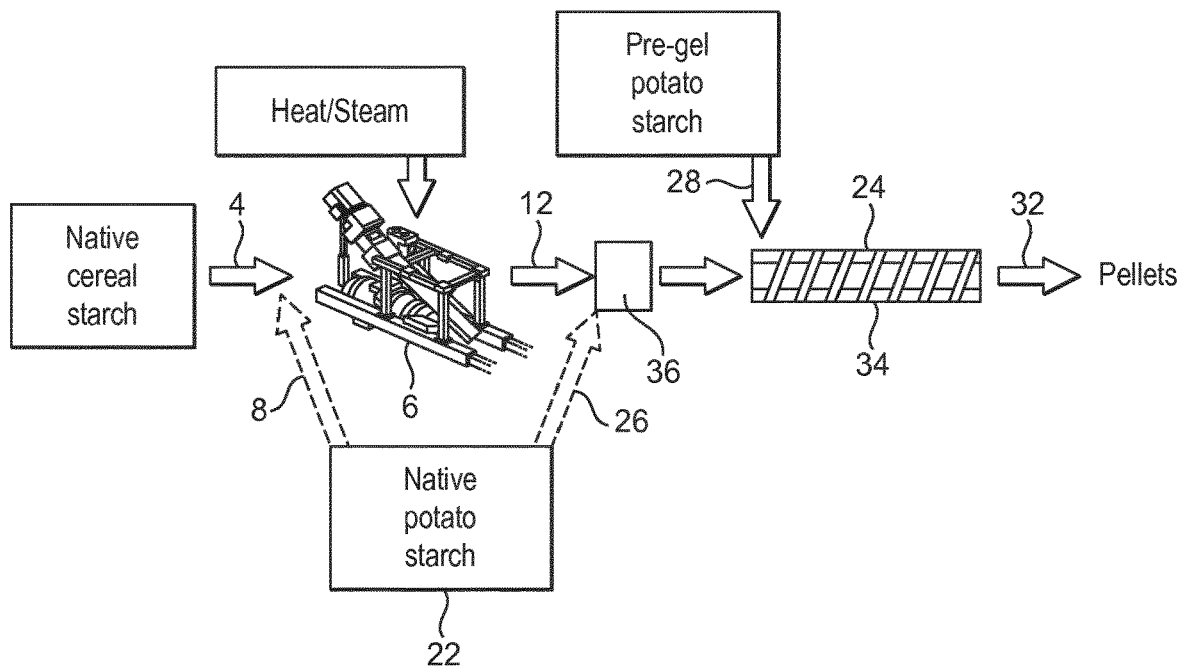
FIG. 2 is a schematic side view of an apparatus for carrying out the process flow of the method of FIG. 1.

Referring to FIG. 1, there is shown a schematic process flow of a method of manufacturing a starch-based snack food pellet for manufacturing an expanded snack food according to a preferred embodiment of the present invention. FIG. 2 schematically shows the apparatus used in the method of FIG. 1.

As shown in FIGS. 1 and 2, in a first step 2 of the method a first starch ingredient 4 is fed into a cooking device 6. The first starch ingredient comprises, or preferably consists of, native starch. Preferably, the first starch ingredient comprises or consists of native cereal starch, optionally in combination with one or more of a native root starch (such as tapioca or sweet potato starch) and a native pulse starch (such as pea or bean starch). Typically, the cooking device 6 is a mixer having an input for thermal and mechanical energy, or a thermal cooker adapted to input a steam jet into a cooking chamber. Both of these devices are known in the art of snack food pellet manufacture.

In a second step 10, mechanical and thermal energy are inputted into the cooking device 6 so as to cook and gelatinise the first starch ingredient 4 in the cooking device 6. The mechanical energy is provided by mechanical mixing. The thermal energy is provided by steam. Preferably, both mechanical mixing and steam are applied to the first starch ingredient 4. Typically, the mechanical energy is provided by mixing the cereal starch ingredient 4 at a shear rate of from 40 to 100 $s^{-1}$. Typically, the steam is at a temperature of from 157 to 172° C. and/or at a pressure of from 6 to 8 bars. This step 10 provides a processed starch component 12.

Typically, the processed cereal starch component 12 comprises cereal starch in which from 40 to 80 wt % of the cereal starch has been gelatinised, as measured by an enzymatic method, for example the Kansas method which is known in the art. During step 10, the average molecular weight of the native starch is reduced. After step 10, the native starch in the processed starch component 12 typically has a viscosity of from 100 to 150 Pa·s and/or a melting point of less than 150° C., for example from 50 to 100° C., as measured by differential scanning calorimetry (DSC).

Thereafter, in a third step 20 a native potato starch ingredient 22 is added to the processed starch component 12 to provide a starch mixture 24. The potato starch ingredient 22, comprises or preferably consists of, a first native potato starch 26. The addition may be within or outside the cooking device 6, but the potato starch ingredient 22 is not processed within the cooking device 6 as described for the first starch ingredient 4.

Before ingredients 12 and 22 enter the extrusion/forming, they are preferably mixed with water in a mixer 36, such as a paddle mixer, during a mixing step 38 to form a starch/water mix having a 30-50 wt % moisture content, based on the total weight of the starch/water mix.

Finally, in a fourth step 30, the starch mixture 24 is formed into pellets 32 by extrusion in a former/extruder 34. Typically, the starch mixture 24 is mixed and extruded within a temperature range of from 50 to 80° C. and/or at a pressure of from 20 to 130 bars. Typically, the starch mixture is mixed and extruded at a shear rate of from 3000-5000 $s^{-1}$ in the screw/barrel region of the screw extruder and from 500-700 $s^{-1}$ in the die of the extruder.

After the fourth step 30, the pellets 32 typically have a bulk density of 200 to 800 kg/m³. Preferably, the pellets 32 have a water content of from 9 to 13 wt % based on the weight of the pellet.

With respect to the starch mixture in the pellets 32, the pellets 32 comprise from 40 to 70 wt % of a gelatinised non-potato starch derived from the first starch ingredient 4, for example cereal starch, from 10 to 40 wt % of a native potato starch and from 20 to 70 wt % of a gelatinised potato starch, each wt % being by weight of the starch mixture.

In accordance with the illustrated embodiment of the present invention, in the first step 2, a second native potato starch 8 is inputted into the cooking device 6, additional to the other cereal starch ingredient 4. Typically, the second native potato starch 8 comprises from 10 to 30 wt % of the starch mixture produced in the fourth step 30, by weight of the starch mixture. When the second native starch 8 is employed, the first and second native potato starches 26, 8 are provided from a single common source and are divided between adding, respectively, downstream and upstream of the cooking device 6 and are in a weight ratio of from 1:3 to 4:1.

Furthermore, in accordance with the illustrated embodiment of the present invention, in the third step 20 the potato starch ingredient 22 further comprises a pre-gelatinised potato starch 28. The pre-gelatinised potato starch typically comprises dehydrated potato, for example as potato granules and/or potato flakes, but may be present in the form of a powder or ground flour. The pre-gelatinised potato starch 28 may be added into the former/extruder 34 or into the mixer 36.

The starch-based snack food pellet 32 produced by the method comprises a starch matrix formed of a starch mixture. In accordance with the illustrated embodiment of the present invention, the starch mixture comprises, wherein each wt % is based on the weight of the starch mixture:

a. from 40 to 70 wt % of a gelatinised non-potato starch, which has been produced from the first starch ingredient 4 and has been cooked and gelatinised in the cooking device 6;

b. from 10 to 40 wt % of a native potato starch, which has been provided by the first native potato starch 26, downstream of the cooking device 6 and so has not been gelatinised in the cooking device and remains substantially crystalline; and c. from 20 to 70 wt % of a gelatinised potato starch, which has been produced from the combination of the second native potato starch 8 added to, and gelatinised in, the cooking device 6 and the pre-gelatinised potato starch 28 which is added into the former/extruder 34 downstream of the cooking device 6.

When the first and second native potato starches 26, 8 have been added as described above, typically with respect to the starch mixture in the pellets 32, and produced in the fourth step 30, the starch mixture comprises from 40 to 70 wt % of gelatinised non-potato starch, derived from the first starch ingredient 4, for example cereal starch, from 10 to 40 wt % of a native potato starch, derived from the first native potato starch, from 10 to 30 wt % of a first gelatinised potato starch, derived from the second native potato starch, and from 10 to 40 wt % of a second gelatinised potato starch, derived from the pre-gelatinised potato starch, each wt % being by weight of the starch mixture.

The pellets 32 can be employed to make an expanded snack food by frying, baking, microwaving, popping. Each of these pellet expansion methods being known per se to persons skilled in the art of snack food manufacture.

The present invention is at least partly predicated on the finding by the present inventors that when different starches are processed to form a starch-based snack food pellet, the starches tend to have different original properties prior to processing to form a pellet, different processing parameters to form a pellet, and different material and structural properties in the resultant pellet, which pellet properties are manifested in the properties of the resultant expanded snack food.

In particular, native potato starch tends to be easily gelatinised, as compared to native cereal starch, when subjected to heat and moisture, and native potato starch is often employed as an initial ingredient in pellet extrusion in a pre-gelatinised form. When native potato starch is subjected to low thermal energy/low shear mechanical extrusion, the molecular weight of the potato starch is substantially preserved. Potato starch tends to have a relatively low melting point, and so when the starch is subjected to elevated cooking temperatures, for example in a fryer, the potato starch undergoes a material transformation, in particular melts to provide a starch melt which provides some degree of expansion. The potato starch melt provides a characteristic combination of cellular void size, shape and distribution, and cellular wall thickness, which provides a typical sensory characteristic to expanded snacks incorporating high concentrations of potato starch.

In contrast, as compared to native potato starch, some non-potato native starches, for example native cereal (or pulse or root) starch, when subjected to the same heat and moisture conditions as native potato starch, tend to be less gelatinised than the native potato starch. In particular native cereal starch, as compared to native potato starch, tends to require a high thermal energy/high shear mechanical extrusion in order to provide a corresponding proportion of gelatinised starch. The molecular weight of the native cereal starch is typically damaged, i.e. significantly reduced, by high shear mechanical extrusion. During frying, the processed low molecular weight cereal starch melts and exhibits low viscosity, which provides a high degree of expansion. This produces a very light and airy expanded texture, with large cellular voids and thin cell walls. If native cereal starch with a relatively high melting point is present in a pellet, there is a likelihood that the starch may not melt when subjected to elevated cooking temperatures, for example in a fryer, which would leave unexpanded starch in the snack food, which is undesirable.

When both native potato starch and native cereal starch are combined together as ingredients to produce a pellet for subsequent expansion to form a snack food, it is difficult to process the ingredients to provide the resultant typical sensory characteristic to expanded snacks which incorporate high concentrations of potato starch, namely the characteristic combination of cellular void size, shape and distribution, and cellular wall thickness associated with a high viscosity potato starch melt. The mixture of potato and cereal starches are difficult to process in a common manufacturing step sequence which can provide a composite starch melt which upon expansion provides a controlled and uniform cellular microstructure, and in particular provides a uniform target combination of cellular void size, shape and distribution, and cellular wall thickness.

These different behaviours of potato and non-potato starches has been utilised in the method of the present invention to achieve a desired control over the starch processing of a mixture of potato and non-potato starches for forming a pellet. The properties of the pellet can be readily controlled and consequently the properties of the resultant expanded snack food produced for the pellet can be controlled.

In accordance with the preferred embodiments of the present invention, pellets are produced from a mixture of a cereal (or a selection or combination of one or more cereals and/or pulses) and potato. At least a portion of each starch ingredient type can be processed individually, and separately from at least a portion of the other starch ingredient type and then combined into a starch mixture that is then commonly extruded. This overcomes the problem that some native starches, such as from cereals and pulses, need much more cooking than native potato starch, in order to pre-process their starch constituent prior to extrusion, and the problem that if a starch mixture comprising both potato and non-potato starch is cooked as a whole, if the cereal portion is correctly processed then the potato portion tends to be overcooked the desired potato characteristics in the final expanded snack food are lost.

In accordance with the preferred embodiments of the present invention, instead of processing the whole starch-containing recipe using a common cooking and extruding process, thus potentially undercooking at least one of the starch components and/or overcooking at least one other starch component, with a consequential negative impact on snack food quality, the different starch ingredients can be individually and separately processed during cooking and then combined before extruding and shaping the product.

It has been found by the inventors that individual processing of starch ingredients, or groups of starch ingredients, can provide more control of the characteristics of the resultant snack food. In particularly preferred embodiments of the method of the present invention, by adding a mixer with thermal and mechanical energy input) and/or a thermal cooker adapted to input a steam jet into a cooking chamber to a standard pellet processing line, incorporating an extruder, more control of the product quality and characteristics of expanded snack food produced from pellets can be achieved.

The pellet is produced by a process in which the first starch ingredient, for example comprising or consisting of cereal starch, is processed in a cooking device in which mechanical and thermal energy are inputted so as to cook and gelatinise the cereal starch ingredient in the cooking device, thereby to provide a processed cereal starch component. Thereafter, a native potato starch ingredient is added to the processed cereal starch component to provide a starch mixture which is then formed into pellets by extrusion. The native potato starch is not cooked, but is formed into a pellet by extrusion and the starch is retained as starch granules in the extruded pellet, and so is substantially untransformed with regard to crystallinity and retains a high molecular weight. In the pellet, the native potato starch provides local crystalline regions distributed within amorphous, and/or minimally crystalline, starch formed from the cooked and gelatinised cereal/potato starch.

Some or all of the total native potato starch is inputted directly into the former/extruder, and optionally, a proportion of the total native potato starch may be inputted into the cooking device. By controlling the proportion of the native potato starch that is inputted directly into the former/extruder, the microstructure of the resultant starch blend in the pellet can be controlled to provide desired properties in the resultant expanded snack food. With respect to the total native potato starch which is provided to form the pellet, from greater than 0 to up to 100 wt % of the total native potato starch is inputted directly into the former/extruder, and from 0 to less than 100 wt % of the total native potato starch is inputted into the cooking device. FIGS. 3a to 3d are photomicrographs of a cross-section through pellets having the same starch-based composition but with different proportions of the native potato starch being processed directly by the former/extruder and the cooking device in the method of FIG. 1.

Figure 3A:
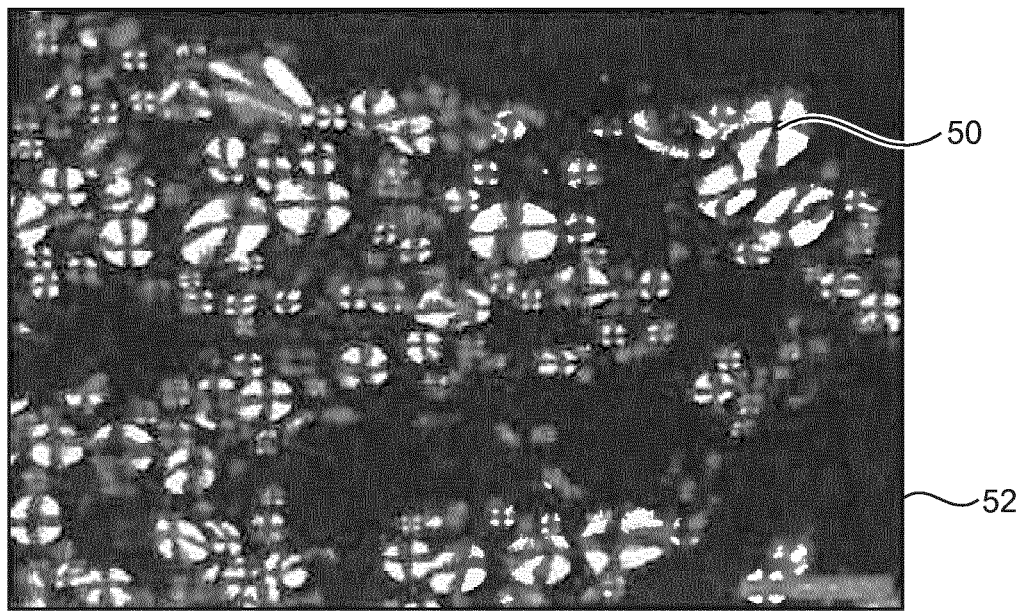
FIGS. 3a to 3d are photomicrographs of a cross-section through pellets having the same starch-based composition but with different proportions of the native potato starch being processed directly by the former/extruder and the cooking device in the method of FIG. 1.

In FIG. 3a, 100% of the native potato starch has been being processed directly by the former/extruder and 0% of the native potato starch has been being processed by the cooking device. The resultant microstructure has a high level of potato starch crystallinity, and minimal cereal starch crystallinity, and crystalline potato starch regions 50 are distributed within amorphous cereal/potato starch 52. This microstructure is characteristic of a potato starch pellet.

Figure 3B:
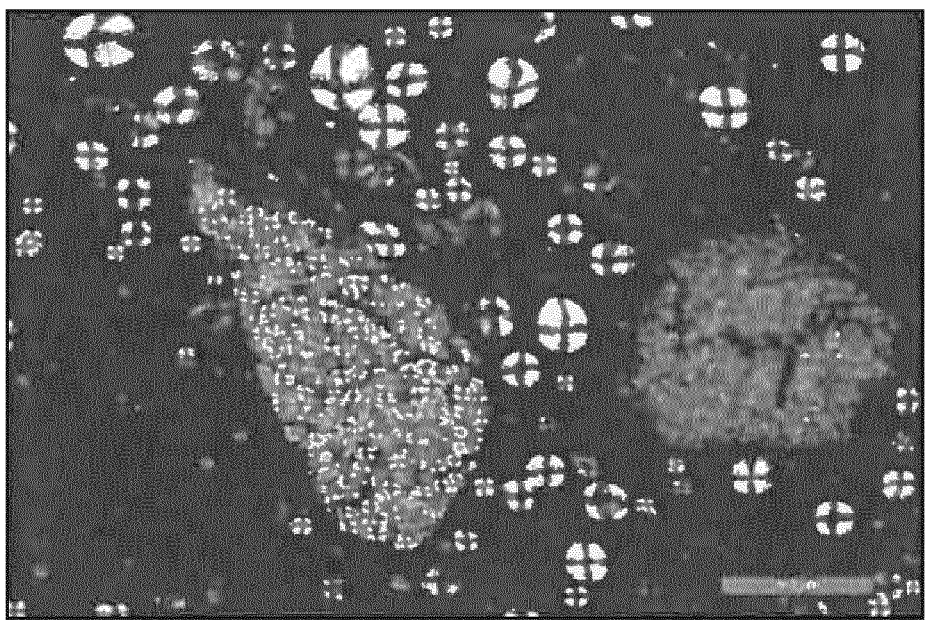
Figure 3C:
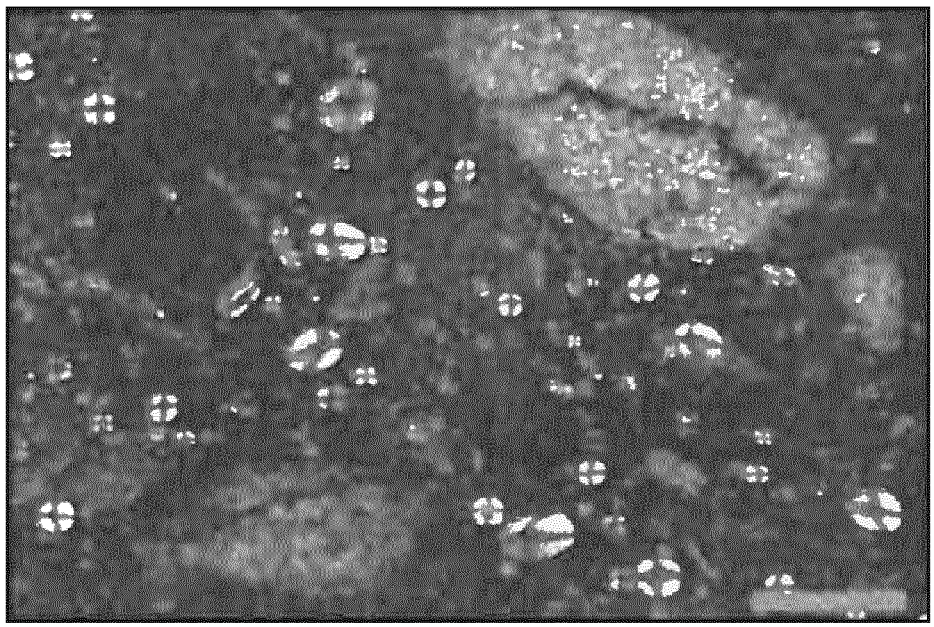
Figure 3D:
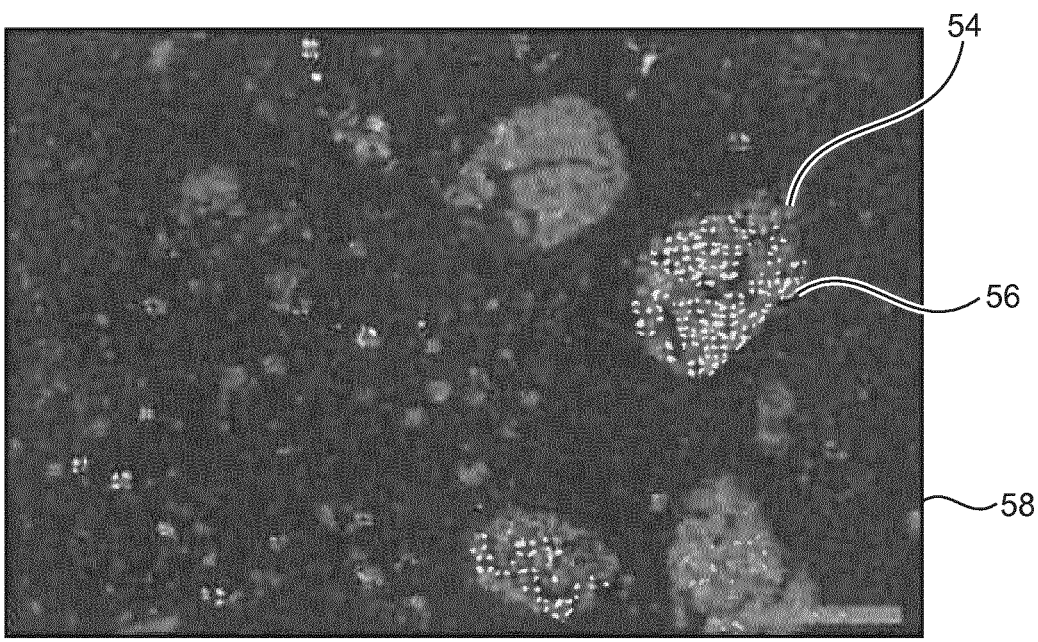

In FIG. 3d, 0% of the native potato starch has been being processed directly by the former/extruder and 100% of the native potato starch has been being processed by the cooking device. The resultant microstructure has minimal potato starch crystallinity, and some cereal starch crystallinity, and the resultant structure is a substantially low crystalline and amorphous microstructure 54 of substantially homogeneous low crystalline composition. During processing in the cooking device, the potato starch has been preferentially hydrated and gelatinised as compared to the cereal starch, leaving regions 56 having a low level of cereal starch crystallinity within a generally amorphous cereal/potato starch blend 58.

In FIG. 3b, 67% of the native potato starch has been being processed directly by the former/extruder and 33% of the native potato starch has been being processed by the cooking device. In FIG. 3c, 20% of the native potato starch has been being processed directly by the former/extruder and 80% of the native potato starch has been being processed by the cooking device. These photomicrographs show that by progressively reducing the proportion of native potato starch processed directly by the former/extruder, and increasing the proportion of native potato starch processed through the cooking device, the potato starch crystallinity is reduced, which modifies the pellet texture and behaviour during expansion.

Figure 4:
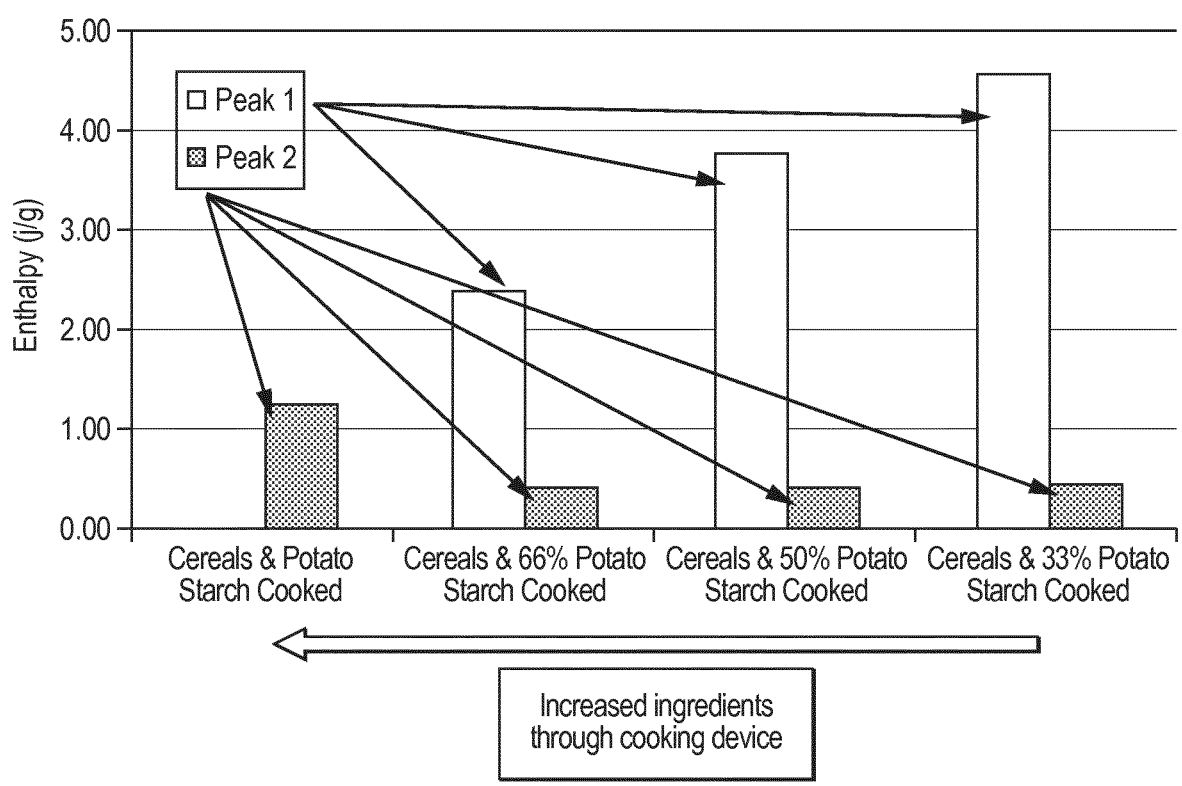
FIG. 4 is a bar chart which shows the relationship between enthalpy during a starch gelatinisation test of pellet compositions having starch-based composition but with different proportions of the native potato starch being processed directly by the former/extruder and the cooking device in the method of FIG. 1.

FIG. 4 is a bar chart which shows the relationship between enthalpy during a starch gelatinisation test of pellet compositions having starch-based composition but with different proportions of the native potato starch being processed directly by the former/extruder and the cooking device in the method of FIG. 1. When a starch is heated in the presence of water, if the starch gelatinises then heat is required to achieve the starch transformation. In FIG. 4, for the bar marked A, all of the native cereal starch and native potato starch has been processed through the cooking device, and so the starch has been gelatinised. When the pellet is tested by heating in the presence of excess water, there is minimal further starch gelatinisation and the measured enthalpy is low. In contrast, for the bar marked D, all of the native cereal starch and 33 wt % of the native potato starch has been processed through the cooking device, and 67 wt % of the native potato starch has been added directly into the input of the former/extruder and so a majority of the native potato starch is crystalline in the pellet. When the pellet is tested by heating in the presence of water, there is significant further starch gelatinisation from the native potato starch and the measured enthalpy from that starch transformation is high, together with a small measured enthalpy from the cereal starch. For the bars marked B and C, respectively 50 or 66 wt % of the native potato starch has been processed through the cooking device, and 50 or 33 wt % of the native potato starch has been added directly into the input of the former/extruder, as well as, in each case, all of the native cereal starch being processed through the cooking device. For these plots, about half or a minority of the native potato starch is crystalline in the pellet. When these pellets are tested by heating in the presence of water, as compared to bar D there is progressively reduced further starch gelatinisation from the native potato starch and the measured enthalpy from that starch transformation is progressively reduced, together with a small measured enthalpy from the cereal starch.

Figure 5:
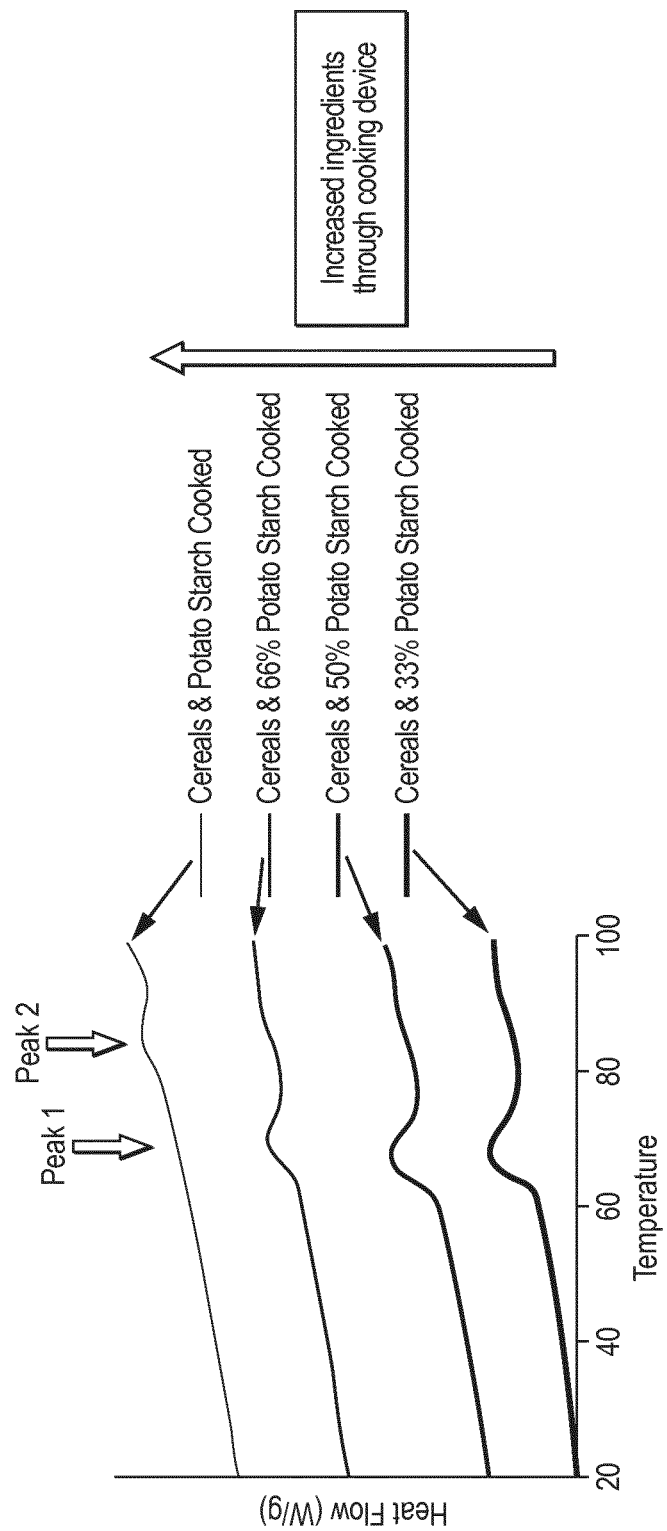
FIG. 5 is a graph which shows the relationship between heat flow and temperature during a starch gelatinisation test of pellet compositions having starch-based composition but with different proportions of the native potato starch being processed directly by the former/extruder and the cooking device in the method of FIG. 1.

FIG. 5 is a graph which shows the relationship between heat flow and temperature during a starch gelatinisation test of pellet compositions having starch-based composition but with different proportions of the native potato starch being processed directly by the former/extruder and the cooking device in the method of FIG. 1. When a starch is heated in the presence of water, if the starch gelatinises then heat is required to achieve the starch transformation, and the starch gelatinisation is represented by a peak in heat flow. In FIG. 5, for the plot marked A, all of the native cereal starch and native potato starch has been processed through the cooking device, and so the starch has been gelatinised. When the pellet is tested by heating in the presence of water, there is minimal further starch gelatinisation and there is a very small peak in heat flow at a relatively high temperature (above 80° C.) which represents cereal starch gelatinisation. In contrast, for the plot marked D, all of the native cereal starch and 33 wt % of the native potato starch has been processed through the cooking device, and 67 wt % of the native potato starch has been added directly into the input of the former/extruder and so a majority of the native potato starch is crystalline in the pellet. When the pellet is tested by heating in the presence of water, there is significant further starch gelatinisation from the native potato starch and there is a large peak in heat flow at a relatively low temperature (below 80° C.) which represents potato starch gelatinisation, and there is almost no peak in heat flow at a relatively high temperature (above 80° C.) which represents cereal starch gelatinisation because potato starch gelatinisation occurs preferentially to cereal starch gelatinisation. For the plots marked B and C, respectively 50 or 66 wt % of the native potato starch has been processed through the cooking device, and 50 or 33 wt % of the native potato starch has been added directly into the input of the former/extruder, as well as, in each case, all of the native cereal starch being processed through the cooking device. For these plots, about half or a minority of the native potato starch is crystalline in the pellet. When these pellets are tested by heating in the presence of water, as compared to plot D there is a progressively reduced peak in heat flow at a relatively low temperature (below 80° C.) which represents potato starch gelatinisation, and there remains almost no peak in heat flow at a relatively high temperature (above 80° C.) which represents cereal starch gelatinisation.

When the pellet is cooked, during the expansion phase, the starch components in the starch mixture are heated. The high molecular weight and highly crystalline native potato starch melts to form a high viscosity melt and the low molecular weight and amorphous or low crystalline gelatinised cereal/potato starch melts to form a low viscosity melt. The water in the starch evaporates to form steam, which in turn forms the cellular voids or pores. The high viscosity melt tends to provide a low expansion and results in a uniform distribution of small cellular voids with thick cell walls, whereas the low viscosity melt tends to provide high expansion and results in a less uniform distribution of large cellular voids with thin cell walls. The crystalline regions have a high glass transition temperature Tg and tend to reduce bubble collapse and coalescence.

When there is a mixture of high and low crystallinity starches in the pellet, the proportions of crystalline starch and amorphous/low crystalline starch blend can be varied to modify the resultant expanded microstructure. This can be achieved by gelatinising the native cereal starch in the cooking device and selecting the proportion of native potato starch that is either added as an input of the cooking device, and so is gelatinised in the cooking device, or is added to the output of the cooking device and so remains present as native crystalline starch in the pellet. Therefore, the starch crystallinity in the pellet, and the cell structures in the expanded snack food, can be modified independently of cereal starch transformation in the cooking device.

The starch matrix in the pellets of the preferred embodiments of the present invention therefore comprises a first relatively crystalline starch composition, primarily or only consisting of native potato starch, and a second relatively amorphous starch composition, comprising cereal starch and optionally potato starch, the amorphous starch component being more amorphous than the crystalline starch and the crystalline starch being more crystalline than the amorphous starch component, which have been blended together to form the starch matrix. The first starch composition typically comprises from 10 to 40 wt % based on the weight of the starch matrix and the second starch composition typically comprises from 10 to 30 wt % based on the weight of the starch matrix.

Various modifications to the present invention will be readily apparent to those skilled in the art.

The invention claimed is:

1. A method of manufacturing starch-based snack food pellets for manufacturing an expanded snack food, the method comprising the steps of:
   (a) feeding a first non-potato starch ingredient into a cooking device;
   (b) inputting mechanical and thermal energy into the cooking device so as to cook and gelatinize the first non-potato starch ingredient in the cooking device, thereby to provide a processed starch component, wherein the processed starch component comprises cereal starch with a gelatinization of from 40 to 80%;
   (c) adding a potato starch ingredient comprising a first ungelatinzed native potato starch to the processed starch component to provide a starch mixture; and
   (d) forming the starch mixture into the starch-based snack food pellets by extrusion,
   wherein the starch mixture of the starch-based snack food pellets comprises from 40% to 70 wt. % of the gelatinized first non-potato starch ingredient and from 10 to 40 wt. % of the first ungelatinized native potato starch.

2. The method according to claim 1 wherein the cooking device includes a mixer.

3. The method according to claim 1 wherein the cooking device is a thermal cooker adapted to input a steam jet into a cooking chamber of the thermal cooker.

4. The method according to claim 1 wherein in step (b) the mechanical energy is provided by mechanical mixing and/or the thermal energy is provided by steam.

5. The method according to claim 4 wherein the steam is at a temperature of from 157 to 172° C. and/or at a pressure of from 6 to 8 bars absolute.

6. The method according to claim 1 wherein during step (b) the average molecular weight of the first non-potato starch ingredient is reduced.

7. The method according to claim 1 wherein in step (a) the first non-potato starch ingredient comprises native cereal starch in combination with one or more of a native root starch and a native pulse starch.

8. The method according to claim 1 wherein a second ungelatinized native potato starch is inputted into the cooking device prior to inputting the mechanical and thermal energy, wherein in step (b), the second ungelatinized native potato starch is gelatinized to form a second gelatinized potato starch.

9. The method according to claim 8 wherein the starch mixture of the pellets comprises from 10 to 30 wt. % of the second gelatinized potato starch.

10. The method according to claim 8 wherein the first non-potato starch and the second ungelatinized native potato starch are in a weight ratio of from 1:3 to 4:1.

11. The method according to claim 1 wherein in step (c) the potato starch ingredient further comprises a pre-gelatinized potato starch.

12. The method according to claim 11 wherein the pre-gelatinized potato starch comprises dehydrated potato, optionally in the form of granules and/or flakes.

13. The method according to claim 11 wherein the starch mixture of the pellets comprises from 10 to 40 wt. % of the pre-gelatinized potato starch.

14. The method according to claim 1 wherein in step (d) the starch mixture is mixed and extruded within a temperature range of from 50 to 80° C. and/or at a pressure of from 20 to 130 bar absolute.

15. The method according to claim 1 wherein the first non-potato starch ingredient comprises a maize, wheat, oat, rice or barley ingredient, or a mixture of any two or more thereof.

16. The method according to claim 1 wherein the pellets have a bulk density of from 200 to 800 kg/m$^3$.

17. The method according to claim 1 wherein each pellet has a water content of from 9 to 13 wt. % based on the weight of each pellet.

18. A method of manufacturing starch-based snack food pellets for manufacturing an expanded snack food, the method comprising the sequential steps of:
   (a) feeding non-potato starch ingredient into a cooking device;
   (b) feeding a first ungelatinized native potato starch into the cooking device, wherein the non-potato starch and the first ungelatinized native potato starch are in a weight ratio of from 1:3 to 4:1;
   (c) inputting mechanical and thermal energy into the cooking device to cook and gelatinize (i) the non-potato starch ingredient in the cooking device to provide a processed starch component and (ii) the first ungelatinized native potato starch to form a gelatinized potato starch;
   (d) adding a potato starch ingredient comprising a second ungelatinized native potato starch to the processed starch component and the gelatinized potato starch to provide a starch mixture; and
   (e) forming the starch mixture into the starch-based snack food pellets by extrusion,
   wherein the starch mixture of the starch-based snack food pellets comprises from 40% to 70 wt. % of the gelatinized first non-potato starch ingredient and from 10 to 40 wt. % of the second ungelatinized native potato starch.

* * * * *